US012614169B1

(12) United States Patent
Schaak

(10) Patent No.: US 12,614,169 B1
(45) Date of Patent: Apr. 28, 2026

(54) SYSTEMS AND METHODS TO CLASSIFY TRANSACTIONS RECORDED ON IMMUTABLE DISTRIBUTED ELECTRONIC STORAGE MEDIA TO GENERATE GRAPHICAL REPRESENTATIONS OF THE TRANSACTIONS

(71) Applicant: Hindsight VIP, Inc., Boardman, OR (US)

(72) Inventor: Chandler Skylo Schaak, Boardman, OR (US)

(73) Assignee: Hindsight VIP, Inc., Boardman, OR (US)

( * ) Notice: Subject to any disclaimer, the term of this patent is extended or adjusted under 35 U.S.C. 154(b) by 0 days.

(21) Appl. No.: 18/897,455

(22) Filed: Sep. 26, 2024

(51) Int. Cl.
  *G06Q 20/36* (2012.01)
  *G06F 16/27* (2019.01)
  (Continued)

(52) U.S. Cl.
  CPC ......... *G06Q 20/3678* (2013.01); *G06F 16/27* (2019.01); *G06F 16/285* (2019.01); *G06F 16/9024* (2019.01)

(58) Field of Classification Search
  CPC ..... G06F 16/27; G06F 16/285; G06F 16/9024
  See application file for complete search history.

(56) References Cited

U.S. PATENT DOCUMENTS 9,298,806 B1   3/2016  Vessenes
  10,984,412 B2  4/2021  Islam
          (Continued)

FOREIGN PATENT DOCUMENTS

WO   2023129365 A1   7/2023
WO   2024074875 A1   4/2024
WO   2024187848 A1   9/2024

OTHER PUBLICATIONS

Ortu et al.: Taxonomic insights into ethereum smart contracts by linking application categories to security vulnerabilities, 2024, Scientific Reports, nature.com, pp. 1-20. (Year: 2024).

(Continued)

*Primary Examiner* — Khanh B Pham
(74) *Attorney, Agent, or Firm* — Esplin & Associates PC

(57) ABSTRACT

Systems and methods to classify transactions recorded on immutable distributed electronic storage media to generate graphical representations of the transactions are described herein. Exemplary implementations may: obtain transaction information characterizing transactions recorded on a transaction log stored on immutable distributed electronic storage media; determine transaction classifications of transactions and address classifications of addresses; assign one or more visual characteristics to individual addresses and individual transactions based on individual address classes and individual transaction classes, respectively; generate user interface information defining instances of a graphical user interface through which the transactions are represented as a graph; effectuate communication of the user interface information to remotely located client computing platforms associated with users to cause the remotely located client computing platforms to present the instances of the graphical user interface; and/or perform other operations.

20 Claims, 4 Drawing Sheets

(51) Int. Cl.
   *G06F 16/28* (2019.01)
   *G06F 16/901* (2019.01)

(56) References Cited

U.S. PATENT DOCUMENTS

| | | | | |
|---|---|---|---|---|
| 11,029,806 | B1* | 6/2021 | Wijegunawardana | .......................... G06F 3/0482 |
| 11,769,577 | B1 | 9/2023 | Dods | |
| 11,928,732 | B1 | 3/2024 | Skala | |
| 2019/0205480 | A1* | 7/2019 | Zhang | ............... G06F 16/90348 |
| 2020/0267020 | A1* | 8/2020 | Doney | ................ G06F 16/9024 |
| 2021/0383395 | A1* | 12/2021 | Galka | ................ G06Q 20/0655 |
| 2022/0027900 | A1* | 1/2022 | Suh | .................... G06Q 20/3829 |
| 2022/0292507 | A1 | 9/2022 | Galka | |
| 2023/0070625 | A1 | 3/2023 | Gaur | |
| 2023/0328098 | A1 | 10/2023 | Illum | |
| 2023/0376581 | A1 | 11/2023 | Shear | |
| 2023/0376594 | A1* | 11/2023 | Dalal | .................... G06F 21/552 |
| 2024/0070233 | A1 | 2/2024 | Blackburn | |
| 2024/0169257 | A1* | 5/2024 | Sharma | .................. G06N 20/00 |
| 2024/0330927 | A1 | 10/2024 | Abdelrahman | |
| 2024/0330959 | A1* | 10/2024 | Blanuša | ................. G06Q 40/00 |
| 2024/0405990 | A1* | 12/2024 | Coughlan | ............. H04L 9/3213 |
| 2024/0428958 | A1 | 12/2024 | Hwang | |

OTHER PUBLICATIONS

Pierro, Giuseppe, A.: Smart-Graph: Graphical Representation for Smart Contract on the Ethereum Blockchain, Mar. 2021, HAL Science, pp. 1-8. (Year: 2021).
Sm4rty: Smart Contract Diagramming for Security: A Visual Approach , Sep. 10, 2023, Medium, pp. 1-31 (Year: 2023).
PCT International Search Report and Written Opinion, International Application No. PCT/US25/48258, mailed Dec. 11, 2025. 13 pages.

* cited by examiner

SYSTEMS AND METHODS TO CLASSIFY TRANSACTIONS RECORDED ON IMMUTABLE DISTRIBUTED ELECTRONIC STORAGE MEDIA TO GENERATE GRAPHICAL REPRESENTATIONS OF THE TRANSACTIONS

FIELD OF THE DISCLOSURE

The present disclosure relates to improvements in graphical user interfaces and, in particular, classifying transactions recorded on immutable distributed electronic storage media, and assigning visual characteristics to addresses and transactions based on the classifications to provide a basis for generating graphical representations of the transactions.

BACKGROUND

Blockchain technology uses the blockchain, otherwise known as a distributed ledger, a public ledger, a transaction database, and/or other terms, to create a publicly verifiable record of transactions. The blockchain may be implemented through a network of independent and geographically distributed computers, often called nodes, which work together to manage and validate transactions. Each of the computers may store and maintain a copy of the blockchain. Transactions may involve cryptocurrency transactions. Cryptocurrency may be "spent" by adding a new transaction to the blockchain which indicates an amount of value transferred between one or more input addresses (e.g., sender) and one or more output addresses (e.g., recipient).

A "block explorer" may refer to an online tool that allows users to view and interact with information on a blockchain, which presents technical data in textual and/or table forms.

SUMMARY

Current block explorers are problematic. They present technical data in textual and/or table forms, which is not user-friendly for a percentage of the population that already finds blockchain confusing. The explorers confuse new users and do not aid in understanding blockchain concepts.

To address these and/or other problems, one or more implementations presented herein propose techniques to generate an improved graphical user interface, by classifying transactions recorded on a transaction log (e.g., a blockchain) stored on immutable distributed electronic storage media (e.g., a network of independent and distributed computers and/or other storage media) to generate graphical representations of the transactions. Graphical representation may be achieved through visualizations with shapes (e.g., graph nodes), lines (e.g., graph edges), and/or other content to show activities on the immutable distributed electronic storage media while clearly differentiating between different participants (e.g., addresses) and visualizing the flow of value being transferred. Different classes of transactions may be represented differently so as to visually distinguish between the different classes of transactions. Different classes of addresses may be represented differently so as to visually distinguish between the different classes of addresses. This makes the underlying information more understandable, ensuring users don't need to decipher complex strings of characters to gain insights.

These, along with other features and/or functionality presented herein, may be recognized by persons of ordinary skill in the art as providing improvements upon graphical user interfaces, and technology solutions that are implemented through distributed electronic storage media. Further, persons of ordinary skill in the art will recognize that feature(s) and/or functionality described herein are necessarily rooted in computer technology.

One or more implementations of a system configured to classify transactions recorded on immutable distributed electronic storage media to generate graphical representations of the transactions may include one or more of non-transitory electronic storage, one or more hardware processors (also referred to herein as "physical" processors) configured by machine-readable instructions, and/or other components. Executing the machine-readable instructions may cause the one or more hardware processors to facilitate classifying transactions recorded on immutable distributed electronic storage media to generate graphical representations of the transactions, as described herein. The machine-readable instructions may include one or more computer program components. The one or more computer program components may include one or more of a transaction component, a classification component, a user interface component, and/or other components.

The transaction component may be configured to obtain transaction information and/or other information. The transaction information may characterize transactions recorded on a transaction log stored on immutable distributed electronic storage media and/or other storage media. The transaction information may include identification of one or more addresses associated with the transactions, and/or other information. By way of non-limiting illustration, first transaction information may characterize a first transaction and/or other transactions. The first transaction may be characterized by one or more of a first address, a second address, a first transaction flow, and/or other information.

The classification component may be configured to determine transaction classifications of transactions. Individual transactions may be classified in individual transaction classes. By way of non-limiting illustration, the first transaction may be classified in a first transaction class.

The classification component may be configured to determine address classifications of address. Individual addresses may be classified in individual address classes. By way of non-limiting illustration, the first address may be classified in a first address class. By way of non-limiting illustration, the second address may be classified in a second address class.

The user interface component may be configured to assign one or more visual characteristics to individual addresses based on individual address classes and/or other information. The user interface component may be configured to assign one or more visual characteristics to individual transactions based on individual transaction classes and/or other information. By way of non-limiting illustration, the first address may be assigned a first visual characteristic based on classification in the first address class. The second address may be assigned a second visual characteristic based on classification in the second address class. The first transaction may be assigned a third visual characteristic based on classification in the first transaction class.

The user interface component may be configured to generate user interface information defining instances of a graphical user interface through which the transactions are represented as a graph and/or in other ways. By way of non-limiting illustration, the graphical user interface may display, within a field of two or more dimensions, at least a graph portion of the graph. The graph may be comprised of one or more of graph nodes, graph edges between graph nodes, and/or other content. The graph nodes within the graph may represent the addresses. The graph edges between the graph nodes may represent transaction flow between the addresses. The graph nodes may be presented with the visual characteristics assigned to the addresses. The graph edges may be presented with the visual characteristics assigned to the transactions. By way of non-limiting illustration, the user interface information may define a first instance of the graphical user interface through which the first transaction is represented in a first graph portion of the graph. The first instance of the graphical user interface may display one or more of a first graph node representing the first address, a second graph node representing the second address, a first graph edge representing the first transaction flow between the first address and the second address, and/or other content. The first graph node may be presented with the first visual characteristic assigned to the first address. The second graph node may be presented with the second visual characteristic assigned to the second address. The first graph edge may be presented with the third visual characteristic assigned to the first transaction.

The user interface component may be configured to establish one or more network connections with remotely located client computing platforms associated with users.

The user interface component may be configured to effectuate communication of the user interface information to the remotely located client computing platforms associated with the users to cause the remotely located client computing platforms to present the instances of the graphical user interface. By way of non-limiting illustration, the user interface information defining the first instance of the graphical user interface may be communicated to a first remotely located client computing platform over a first network connection. Reception of the user interface information at the first remotely located client computing platform may cause the first remotely located client computing platform to display the first graph portion including one or more of the first graph node, the second graph node, the first graph edge connecting between the first graph node and the second graph node, and/or other content. The first graph node may be presented with the first visual characteristic. The second graph node may be presented with the second visual characteristic. The first graph edge may be presented with the third visual characteristic.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1). As used herein, the phrase "configured to" is intended to be interpreted broadly, as "being capable of or suitable for performing" some function or feature, without requiring any adaptations to provide said function or feature.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
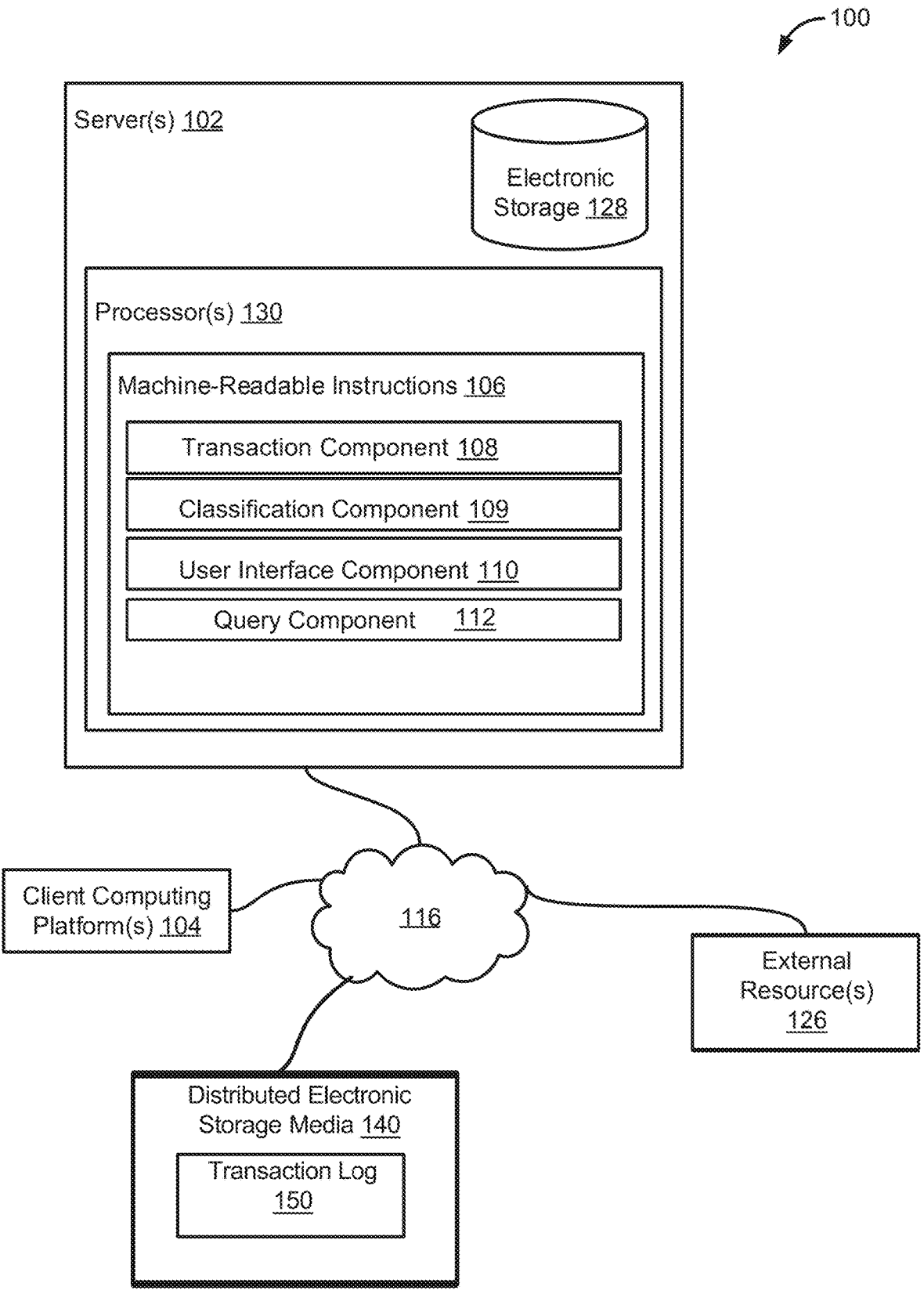
FIG. 1 illustrates a system configured to classify transactions recorded on immutable distributed electronic storage media to generate graphical representations of the transactions, in accordance with one or more implementations.

FIG. 1 illustrates a system 100 configured to classify transactions recorded on immutable distributed electronic storage media 140 to generate graphical representations of the transactions, in accordance with one or more implementations. In some implementations, immutable distributed electronic storage media 140 may include a set of one or more electronic storage media on which the rights to, and/or transactions of, value are stored. In some implementations, immutable distributed electronic storage media 140 may be decentralized or centralized. In some implementations, immutable distributed electronic storage media 140 may be public or private. In some implementations, immutable distributed electronic storage media 140 may store a transaction log 150, and/or other information.

The transaction log 150 may include one or more records of transactions involving the transfer of value and/or other information. In some implementations, transaction log 150 may record indications of ownership rights and/or other information. In some implementations, value may be removed from transaction log 150 and added or recorded on another transaction log (not shown in FIG. 1) stored on immutable distributed electronic storage media 140 and/or other storage media.

In some implementations, transaction log 150 may be in the form of one or more of an audit trail, an electronic ledger, and/or other forms. By way of non-limiting illustration, transactions recorded in transaction log 150 and stored on immutable distributed electronic storage media 140 may form a distributed electronic ledger. An example of a distributed electronic ledger may include a blockchain.

The transaction log 150 may comprise transaction records that are grouped or linked together. For example, a transaction log may be comprised of a set of transaction records, with an individual transaction record corresponding to one or more transactions. In relation to a blockchain, an individual record may be referred to as a block. For example, an individual record may be linked to one or more other individual records. Individual record may be linked or chained together to form a structure of records and/or a hierarchy of records, such as, a chain of records.

Transactions may be defined within individual records by one or more of transaction identification ("transaction ID"), sender identification (e.g., sender addresses), recipient identification (e.g., recipient addresses), transaction fee(s), type of value transferred, amount of value transferred, timestamp when recorded (and/or timestamp when requested to be recorded), record location, transaction flow, function calls, progress characteristics, and/or other information. Transaction IDs may include unique identifiers that distinguish individual transactions from other transactions. A unique identifier for a transaction ID may comprise a string of alphanumeric characters. Addresses may comprise unique identifiers that identify individual participants (e.g., senders and recipients) involved in the transfer of value recorded to the transaction log 150 and distinguish individual participants from other participants. A unique identifier for an address may comprise a string of alphanumeric characters. A transaction fee may include the cost associated with processing a transaction. A timestamp may include a date and/or time (e.g., exact date and/or time) when a transaction was recorded to the transaction log 150. A record location may include an identification of where in the transaction log 150 a transaction was recorded. A record location may include, for example, a unique identifier associated with a specific record within a set of records forming the transaction log 150. A function call may refer to the invocation of a specific function within a smart contract. Progress characteristics may include a current state of progress and/or other information. A current state of progress may include one or more of amount of time lapsed, amount of time remaining, amount of steps completed, amount of steps remaining, and/or other measure of state of progress.

The transaction flow may include information which differentiates, for individual addresses, between transactions where value is being sent and where value is being received, and/or may include other information. By way of non-limiting illustration, the transaction flow may identify, for individual addresses and individual transactions, whether the individual transactions are "incoming" transfers of value or "outgoing" transfers of value. Accordingly, the transaction flow may identify, directly and/or indirectly, a direction in which value is "moving," e.g., from one address to another.

In some implementations, transaction flow for an individual transaction may include information referencing one or more prior transactions and/or information. The information referencing an individual prior transaction may include an indication of an amount of value available to be transferred by a given address (e.g., "unspent value"). The transaction flow of a given transaction may, at the conclusion of the given transaction, include and/or generate information indicating remaining unspent value. Remaining unspent value may be determined, for example, based on a given amount of value available to be transferred (obtained by referencing a prior transaction), less the value transferred in the given transaction. Accordingly, a subsequent transaction may reference the record of the given transaction to obtain an indication of an update to the amount of value available to be subsequently transferred.

In some implementations, the term "value" as used herein may refer to a digital representation of importance, monetary worth, and/or usefulness. Rights pertaining to value may be tracked, recorded, and/or otherwise registered on transaction log 150. Value may be expressed quantitatively as a unit of value, a subunit of value (e.g., a fraction or percentage of a unit of value), an amount of value (e.g., an amount of multiple units of value), and/or other expressions. Value may be uniquely identified and/or uniquely identifiable. Value may be conveyed in the form of one or more of tokens (e.g., tokens of value), coins, assets, credits, and/or other forms. A unit of value may be fungible if it is functionally and/or physically indistinguishable from other units of value. Value may be non-fungible if it is unique and distinguishable from other value (e.g., "one-of-a-kind"). Value may be semi-fungible if there is a set of a limited number of similar but distinguishable units of value.

In some implementations, individual units of value may be characterized by value types. Value types may include one or more of a currency type, utility type, a security type, a non-fungible type, a governance type, and/or other types.

Currency type value may comprise a store of monetary value. Currency type value may be fungible. Currency type value may include one or more of digital currency, cryptocurrency, and/or other considerations. By way of non-limiting illustration, currency type value may include one or more of Ethereum, Bitcoin, Solana, Litecoin, and/or other stores of monetary value.

Utility type value may be designed to provide access to specific features or services. Unlike currency type value, which primarily serves as a medium of exchange or store of monetary value, utility type value may be used within a specific application or network. By way of non-limiting illustration, utility type value may be used to pay for trading fees, participate in sales, access premium content, utilize certain functionalities within a decentralized application (dApp), and/or provide other features and/or functionality.

Security type value may represent ownership and/or investment in a real-world asset and/or financial instrument. Security type value may include security tokens and/or other representation of ownership and/or investment in a real-world asset and/or financial instrument.

Non-fungible type value may represent ownership of a unique item and/or content. Unlike fungible value (e.g., currency type value) which is interchangeable and identical in value, non-fungible type value may be distinct and may not be exchangeable on a one-to-one basis. In some implementations, units of value of the non-fungible type may exist as whole, indivisible units (e.g., cannot be divided into smaller subunits). By way of non-limiting illustration, non-fungible type value may include non-fungible tokens ("NFTs").

Governance type value may represent voting rights and/or influence over the decisions and/or operations of a decentralized organization or protocol (and may provide holders thereof with those rights).

Participants in the transactions (e.g., senders and/or recipients) may be identified by addresses. An individual address may be associated with an individual participant. Addresses may correspond to one or more of digital wallets, smart contracts, validator addresses, staking addresses, bridge addresses, exchange addresses (e.g., exchange account receive address), and/or other addresses.

The transaction log 150 may be maintained by one or more distributed computing platforms (not shown in FIG. 1). A distributed computing platform may include electronic storage media (e.g., immutable distributed electronic storage media 140) configured to store part or all of transaction log 150. In some implementations, a distributed computing platform may be implemented by one or more of client computing platforms, non-transitory electronic storage, and/or servers. An individual client computing platform, electronic storage, and/or server may form a "node" within the distributed computing platform. An individual node may store an individual instance of transaction log 150 (e.g., a copy of transaction log 150). An individual node may perform a consensus process by which some or all nodes agree on a state of transaction log 150, including whether transactions are valid and should be recorded. A consensus process may prevent double-spending, ensure integrity and consistency of transaction log 150, and maintain trust among participants. A consensus process may ensure a single version of transaction log 150 is stored among the distributed nodes, while further ensuring consistency and security without a central authority. By way of non-limiting illustration, the consensus process may include one or more of creating a transaction, broadcasting the transaction to the network (e.g., to some or all nodes), validating it at individual nodes (e.g., verifying transaction flow, sufficient funds, etc.), proposing the validated transaction be included in the transaction log, achieving consensus (by some or all nodes) that the transaction is valid, confirming compliance with other network-specific rules, recording/including the transaction in the transaction log, and/or other operations.

In some implementations, immutable distributed electronic storage media 140 may be publicly accessible. In some implementations, immutable distributed electronic storage media 140 may be private and/or permissioned. In some implementations, transaction log 150 may be append-only. In some implementations, existing records of transaction log 150 may not be altered or deleted, unless multiple copies are altered and/or consensus between nodes is achieved. This is unlikely to happen provided that the multiple instances (e.g., copies) are stored on different computing platforms, e.g., in different geographical locations. The multiple instances may be synchronized and/or synchronizable. By way of non-limiting illustration, when a node makes an update to its instance of the transaction log 150, the node may then propagate (e.g., broadcast) its updated instance to other nodes in the network. The other node(s) may then update their instance(s). If a node determines its instance does not match the instance(s) of one or more other nodes, the node may request one or more updates from one or more other nodes.

Individual records may be linked together in a manner that prevents tampering and/or may have other features that establish an "immutable" characteristic of this storage scheme. By way of non-limiting illustration, records may be linked together using a hash chain and/or digital signatures. Hash values may be generated using fixed-output-length one-way hashing functions that take variable-length input, and may be effectively impossible (or, at least, computationally infeasible) to reverse. As such, a hashing function may provide one-way encryption. Contents of individual records may be digitally signed in a manner that proves integrity and/or prevents tampering, e.g., by providing authentication, as well as non-repudiation.

Individual addresses may be classified in individual address classes. The address classes may include one or more of a wallet class, a contract class, a validator class, a stake class, a bridge class, an exchange class, and/or other classes.

An address of a wallet class may correspond to a digital wallet. A digital wallet may refer to an electronic tool (e.g., software application) used to manage value and/or other information. By way of non-limiting illustration, a digital wallet may store information such as payment credentials, user details, and/or other information. Payment credentials may include one or more of banking information, key information, and/or other information. The key information may include public and/or private keys. Public keys may be used to receive funds and/or to verify transactions. Public keys may be shared with others without compromising security. Private keys may be used to sign transactions, and serve as proof the owner has the right to access and/or initiate transfers of value associated with a public key. Private keys may remain confidential. Digital wallets may use encryption algorithms to protect private keys.

An address of a contract class may correspond to a smart contract (e.g., contract address). A smart contract may be a digital agreement and/or set of functions. A smart contract may automatically execute and enforce terms of the agreement when certain conditions are met. A smart contract may carry out the terms of an agreement and/or set of function without intermediaries. In some implementations, terms may be carried through execution of a series of steps.

An address of the validator class may correspond to a validator (e.g., validator address). A validator may refer to a participant that checks and confirms transactions and/or transaction records. A validator may be tasked with ensuring transactions are valid and that a network operates correctly. Validators are crucial for maintaining a network's security and integrity. Validators may check and confirm that transactions are valid according to the network's rules. This may involve ensuring that transactions are correctly signed, inputs are available, and there are no double-spends. Validators may provide new transaction records to add to a transaction log. They may select and bundle valid transactions into a new record, which is then submitted to the network for approval. Validators may participate in a consensus mechanism to agree on the state of a transaction log. They help achieve consensus on which transactions and records are valid. Validators may perform a series of steps in the execution of their functionality. Validators may perform other functionality.

An address of a stake class may correspond to a staking wallet. A staking wallet may participate in a staking process or similar consensus functionality. A staking wallet may manage and/or track value that is being used to participate in a staking process. A staking process may involve depositing and/or holding value in a dedicated wallet and/or in association with a dedicated address to support operations of a network, such as validating transactions and/or securing a network. A staking process may hold value for an amount of holding time (e.g., 30, 60, 90, or 120 days). After completion of holding time, the value may be unlocked, e.g., deposited back in a user's wallet. A staking wallet may ensure value is securely held and/or managed in accordance with a network's staking rules and/or protocols. Staking may be commonly used in Proof of Stake (POS) mechanisms, where network validators are chosen based on amount of value they stake. In return for staking value, users may earn rewards, often in the form of additional value. This is an incentive for participating and/or supporting a network.

An address of a bridge class may correspond to a bridge. A bridge may refer to a technology (e.g., protocol or service) that enables transfer of value and interoperability between different networks, e.g., different transaction logs. Bridges may facilitate the movement of value from one transaction log to another. For example, a bridge may facilitate the transfer of Bitcoin to an Ethereum-based decentralized application (DApp). Bridges may have other features and/or functionality.

An address of an exchange class may correspond to an exchange. An exchange may refer to a platform through which users may initiate purchases, sales, and/or trades of value. By way of non-limiting illustration, for cryptocurrency exchanges, this means converting one cryptocurrency to another or to fiat money. Individual exchanges may use multiple addresses for different purposes.

In some implementations, a total amount of value associated with an address (e.g., "held" by that address) may be determined by examining the transaction log 150, identifying transactions that identify that address, balancing the incoming and outgoing transfers of value associated with that address, determining a total amount of value from the balancing, and/or other processes. By way of non-limiting illustration, the total amount of value associated with an address may be determined by the sum of incoming transfers of value associated with that address less the sum of outgoing transfers of value associated with that address.

In some implementations, individual transactions may be classified in individual transaction classes. The transaction classes may include one or more of a transfer class, a swap class, a stake class, a fee class, a creation class, a contract class, and/or other classes.

A transaction of the transfer class may refer to a transfer of value from one address to another (e.g., one party sends a specific amount of value directly to another party).

A transaction of the swap class may refer to an exchange of value of one type for value of another type.

A transaction of the stake class may refer to the process of transferring value to a staking wallet and/or platform where it can be staked as part of a staking process.

A transaction of the fee class may refer to a transaction involving the payment of fees. By way of non-limiting illustration, fees may be paid to incentivize miners (in Proof of Work networks), validators (in Proof of Stake networks) for processing and confirming transactions, and/or other considerations.

A transaction of the creation class may refer to a creation/addition of new value in a transaction log and transferring the value to one or more specified addresses. Creation of new value may be referred to as "minting." In some implementations, a creation of new records (e.g., blocks in a blockchain) may be directly tied to the creation of new value because the process of record creation may involve the issuance of new value as rewards. This mechanism may ensure new value is introduced into the ecosystem regularly.

A transaction of the contract class may refer to a transaction tied to operations/functions of one or more smart contracts. Smart contracts may be designed to perform a wide range of transfers and/or functions that are tied to their specific operating features and/or functionalities. Such transfers may include one or more of value transfers, value creation, scheduled and/or conditional transfers, complex financial operations (e.g., lending, borrowing, staking, yield farming, etc.), escrow services, multi-signature transactions, governance and voting, royalty payments, and/or other transfers.

In some implementations, transaction log 150 may be accessible via a mobile application and/or a website. Traditionally, a mobile application and/or website may provide a mechanism to search a transaction log, and present the results of the search in a table format comprising a table of text. In the context of blockchain, these tools may be referred to as "block explorers." Current block explorers are problematic. They present technical data in textual and/or table forms, which is not user-friendly for a percentage of the population that already finds blockchain confusing. The explorers confuse new users and do not aid in understanding blockchain concepts.

To address these and/or other problems, one or more implementations of the system 100 presented herein propose techniques to graphically represent transactions based on classification of transactions. In some implementations, system 100 may include one or more of one or more servers 102, one or more client computing platforms 104, external resource(s) 126, immutable distributed electronic storage media 140, and/or other components. Server(s) 102 may be configured to communicate with one or more client computing platforms 104, one or more external resources 126, immutable distributed electronic storage media 140, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Individual client computing platforms may be remote from other individual client computing platforms. As used herein, a client computing platform may be referred to as a "remotely located" client computing platform.

External resource(s) 126 may include sources of information outside of system 100, external entities participating with system 100, and/or other resources. By way of non-limiting illustration, external resource(s) 126 may include one or more of other storage media storing other transaction logs, third-party websites and/or information sources storing characterizations of transaction recorded on transaction log 150 and/or other transaction logs, and/or other resources. In some implementations, some or all of the functionality attributed herein to external resource(s) 126 may be provided by resource(s) included in system 100.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate classifying transactions recorded on transaction log 150 stored on immutable distributed electronic storage media 140 to generate graphical representations of the transactions. The computer program components may include one or more of a transaction component 108, a classification component 109, a user interface component 110, a query component 112, and/or other components.

The transaction component 108 may be configured to obtain transaction information and/or other information. The transaction information may characterize transactions recorded on transaction log 150 stored on immutable distributed electronic storage media 140 and/or other storage media. The transactions may be characterized by one or more of addresses associated with the transactions, types of value transferred, amounts of value transferred, amounts of value associated with the addresses (e.g., a "balance" of value associated with an address), transaction flow, progress characteristics, and/or other information. By way of non-limiting illustration, first transaction information may characterize a first transaction and/or other transactions. The first transaction may be characterized by one or more of a first address, a second address, a first type of value transferred, a first amount of value transferred, a first transaction flow, a first amount of value associated with the first address, a second amount of value associated with the second address, and/or other information.

By way of non-limiting illustration, the first transaction flow may include information which identifies the first address as an address from which value is being sent, and the second address as an address to which value is being received. By way of non-limiting illustration, the first transaction flow may identify, for first address, that the first transaction is an "outgoing" transfer of value. By way of non-limiting illustration, the first transaction flow may identify, for the second address, that the first transaction is an "incoming" transfer of value. Accordingly, the transaction flow may identify that the first amount of value transferred is being transferred from the first address and to the second address.

In some implementations, the first transaction flow may indicate (and/or include a reference to) an amount of unspent value associated with the first address. In some implementations, the first transaction flow may indicate (and/or include a reference to) an amount of unspent value associated with the second address. In some implementations, the first transaction flow may generate an indication of an updated unspent value associated with the first address resulting from the first transaction. In some implementations, the first transaction flow may generate an indication of an updated unspent value associated with the second address resulting from the first transaction.

In some implementations, obtaining the transaction information may include one or more of retrieving the transaction information, receiving the transaction information, deriving the transaction information from other information, and/or other processes. In some implementations, transaction information may be received and/or retrieved directly from transaction log 150. That is, the transaction information may comprise the information stored in the transaction log 150 defining the transactions.

In some implementations, obtaining the transaction information may include one or more of obtaining the information stored in the transaction log 150, deriving the transaction information from the information stored in the transaction log 150, and/or other processes. By way of non-limiting illustration, the information stored in the transaction log 150 defining the transactions may not directly include the characterizations which form the transaction information as described herein. Instead, the characterizations of transactions in the transaction information may be derived, inferred, and/or other determined from the information stored in the transaction log 150 itself. In some implementations, the transaction information may be obtained from a source (e.g., an external resource) which has derived the transaction information from the information stored in the transaction log 150 and/or from other information sources.

By way of non-limiting illustration, individual amounts of value associated with individual addresses may not be stored directly in the transaction log 150, but may instead be determined by reviewing sets of transactions recorded on the transaction log 150 that involve the individual addresses. By way of non-limiting illustration, individual amounts of value associated with individual addresses may be determined by the sum unspent value recorded in one or more transactions.

In some implementations, transactions may be defined within individual records of transaction log 150 without some of the information described, for example without specifically including transaction flow as described herein and/or other information. Instead, transaction component 108 may be configured to derive transaction flow based on information that is stored in an individual transaction record and/or other information. By way of non-limiting illustration, information such as sender identification (e.g., sender addresses), recipient identification (e.g., recipient addresses), value transferred, and/or other information stored in transaction log 150 for one or more transactions may be used to derive a transaction flow for an individual transaction. By way of non-limiting illustration, transaction component 108 may be configured to determine that an address identified as a recipient address should have a designation of being associated with an "incoming" transfer of value by virtue of its "recipient" characterization within the transaction log 150 itself. By way of non-limiting illustration, transaction component 108 may be configured to determine that an address identified as a sender address should have a designation of being associated with an "outgoing" transfer of value by virtue of its "sender" characterization within the transaction log 150 itself. By way of non-limiting illustration, transaction component 108 may be configured to derive, infer, and/or otherwise determine transaction information in other ways from one or more information sources.

In some implementations, user interface component 110 may be configured to manage information defining a graph and/or individual portions of the graph through which the transactions are visually represented. The graph and/or individual portions of the graph may provide visualizations of transactions. Managing information may include one or more of determining, obtaining, receiving, requesting, checking, storing, modifying, and/or other operations. Managing information defining a graph and/or individual portions of the graph may include generating the user interface information and/or other processes.

The user interface component 110 may be configured to effectuate presentation of instances of a graphical user interface on client computing platform(s) 104 of the users. The user interface may provide one or more views of a graph and/or individual graph portions, and/or provide other features and/or functionality. In some implementations, an individual view may include textual and/or graphical displays. The user interface may include one or more user interface elements configured to facilitate user interaction with the user interface. By way of non-limiting illustration, user interface elements may include one or more of text input fields, drop-down menus, check boxes, display windows, selectable user interface elements (e.g., virtual buttons, icons, and/or other elements), graphics, panes, and/or other elements.

Effectuating presentation of a graphical user interface may include one or more of generating user interface information defining the user interface, communicating the user interface information to client computing platform(s) 104 over network(s) 116, and/or other operations. Individual client computing platform(s) 104 may receive the user interface information and/or other information. Receipt of the user interface information may cause the client computing platform(s) 104 to present instances of the user interface.

The user interface component 110 may be configured to establish one or more network connections between server (s) 102 and client computing platform(s) 104 associated with users.

The user interface component 110 may be configured to generate user interface information defining instances of a graphical user interface through which the transactions are represented as a graph and/or in other ways. By way of non-limiting illustration, the graphical user interface may display, within a field of two or more dimensions, at least a graph portion of the graph. The graph may be comprised of one or more of graph nodes, graph edges between graph nodes, and/or other content. The graph nodes within the graph may represent the addresses. The graph edges between the graph nodes may represent transaction flow. Individual graph nodes may be presented within individual visual characteristics assigned to the individual addresses based on address classifications, and individual graph edges may be presented within individual visual characteristics assigned to the individual transactions based on transaction classifications.

The classification component 109 may be configured to determine transaction classifications of the transactions. Individual transactions may be classified in individual transaction classes. By way of non-limiting illustration, the first transaction may be classified in a first transaction class.

In some implementations, individual transaction classes of individual transactions may be determined from individual sets of transaction information characterizing one or more transactions, and/or other information. An individual set of transaction information characterizing one or more transactions may be indicative of an individual transaction class of an individual transaction. By way of non-limiting illustration, to classify an individual transaction, classification component 109 may obtain transaction information characterizing the individual transaction and/or other transaction information characterizing one or more other transactions. In some implementations, transaction classes may or may not be explicitly recorded as a distinct attribute in a transaction record. In some implementations, the class of a transaction may be inferred from information recorded on a transaction record and/or information derived from a transaction record.

In some implementations, transaction information characterizing a given transaction may include sufficient information to determine a transaction class of the given transaction. In some implementations, a transaction class of a given transaction may be determined from transaction information characterizing the given transaction and other transaction information characterizing one or more other transactions. That is, one or more other transactions preceding and/or following a given transaction may be analyzed to classify the given transaction.

In some implementations, classification component 109 may utilize and/or reference transaction-class mapping information (stored in electronic storage 128 and/or other storage location) including individual mappings between individual sets of transaction information and individual transaction classes. By way of non-limiting illustration, transaction-class mapping information may include one or more of a mapping between a set of transaction information and the transfer class of transactions, a mapping between a set of transaction information and the swap class of transactions, a mapping between a set of transaction information and the stake class of transactions, a mapping between a set of transaction information and the fee class of transactions, a mapping between a set of transaction information and the creation class of transactions, a mapping between a set of transaction information and the contract class of transactions, and/or other mappings between sets of transaction information and transaction classes.

In some implementations, transaction information indicative of the transfer class may have a basic structure of moving value from one address to another. By way of non-limiting illustration, transfer class transactions may be recorded as a transfer of value of a given type from one address to another.

In some implementations, transaction information indicative of the swap class may have a structure and/or may identify specific functions and/or contract interactions specific to a swap of value. By way of non-limiting illustration, swap transactions may be recorded with details about the value types being swapped, amounts, addresses involved, and/or other information.

In some implementations, transaction information indicative of the stake class may include information characterizing an interaction with a staking contract and/or protocol indicating a staking purpose of a transaction. By way of non-limiting illustration, staking transaction may be recorded with one or more of details about a staking contract, amount staked, staking rewards, and/or other information.

In some implementations, transaction information indicative of the fee class may include information identifying a transaction specifically as a fee and/or information identifying the fee as part of another transaction.

In some implementations, transaction information indicative of the creation class may include one or more of identification of addresses of a particular type (e.g., contract addresses), identification of specific functions and/or contract interactions specific to a creation of value (e.g., a "minting" function), and/or other information. By way of non-limiting illustration, creation class transaction may be recorded with details about a contract address, a value type, an amount of value, functions calls, and/or other information.

In some implementations, transaction information indicative of the contract class may include one or more of identification of addresses of a particular type (e.g., contract addresses), identification of specific functions and/or interactions specific to a smart contract interaction, and/or other information. By way of non-limiting illustration, contract class transaction may be recorded with details about one or more contract addresses, one or more functions calls, contract criteria, and/or other information.

By way of non-limiting illustration, classification component 109 may be configured to identify, from information recorded on the transaction log 150 and/or other information (e.g., transaction information), sets of transaction information indicative of one or more transaction classes. The classification component 109 may be configured to determine, from the sets of the transaction information, the transaction classes of the transactions. By way of non-limiting illustration, the classification component 109 may be configured to determine the first transaction class for the first transaction based on a first set of the transaction information being indicative of the first transaction class. In some implementations, the first set of the transaction information may include the first transaction information characterizing the first transaction and/or other transaction information characterizing one or more other transactions.

The classification component 109 may be configured to determine address classifications of the addresses. Individual addresses may be classified in individual address classes. By way of non-limiting illustration, the first address may be classified in a first address class and the second address may be classified in a second address class.

In some implementations, individual address classes of individual addresses may be determined from individual sets of transaction information characterizing one or more transactions involving the individual addresses, and/or other information. An individual set of transaction information characterizing one or more transactions may be indicative of an individual address class of an individual address. In some implementations, a set of transaction information characterizing one or more transactions involving an individual address may indicate a behavior of the individual address over the one or more transactions. The behavior and/or other information may provide insight into the address class of the address.

By way of non-limiting illustration, to classify an individual address, classification component 109 may obtain transaction information characterizing one or more transactions involving the individual address. In some implementations, address classes may or may not be explicitly recorded as a distinct attribute a given transaction record. In some implementations, the class of an address may be inferred from information recorded on one or more transaction records and/or information derived from the one or more transaction records. That is, a transaction log 150 may or may not directly encode or label the class of an address in recorded information, but instead may be inferred based on one or more of behavior, transaction patterns, known roles, and/or other information.

In some implementations, transaction information characterizing a given transaction involving a given address may include sufficient information to determine an address class of the given address. In some implementations, an address class of a given address may be determined from transaction information characterizing multiple transactions involving the address. That is, one or more other transactions preceding and/or following a given transaction involving an address may be analyzed to determine a class of the address.

In some implementations, classification component 109 may utilize and/or reference address-class mapping information (stored in electronic storage 128 and/or other storage location) including individual mappings between individual sets of transaction information and individual address classes. By way of non-limiting illustration, address-class mapping information may include one or more of a mapping between a set of transaction information and a wallet class of address, a mapping between a set of transaction information and a contract class of address, a mapping between a set of transaction information and a validator class of address, a mapping between a set of transaction information and a stake class of address, a mapping between a set of transaction information and a bridge class of address, a mapping between a set of transaction information and an exchange class of address, and/or other classes of addresses.

In some implementations, transaction information indicative of the wallet class may include one or more of frequency of transactions, amount of transactions, amount of value transferred per transaction, and/or other information. By way of non-limiting illustration, transfers involving digital wallets may generally have varied activity patterns, such as occasional transactions and/or personal (e.g., relatively low value) spending. The transactions from wallet addresses may be often less frequent compared to exchanges, smart contracts, and/or other addresses. Wallet addresses may not follow predictable patterns, and/or may interact with other addresses in a specific way.

In some implementations, transaction information indicative of the contract class of address may include and/or reference function calls and/or other execute code, and/or carry out particular interactions. By way of non-limiting illustration, contract addresses may be identified by their interaction patterns, e.g., frequent interaction with other addresses in ways consistent with executing code. The contract class of address may be associated with transactions including complex data and/or specific conditions. In some implementations, a contract class may be identified through resources that list known contract addresses.

In some implementations, transaction information indicative of the validator class may include one or more of proposing records, validating records, participating in consensus activities, receiving fees from a network, and/or other information. The validator class of address may engage in protocol-specific activities, such as voting on governance proposals or protocol upgrades. Patterns of the validator class of address may include frequent interactions related to record production, staking rewards, and/or other functionality. The validator class of address may be associated with a significant amount of value staked and/or delegated to them.

In some implementations, transaction information indicative of the stake class of address may include one or more of transaction frequency, class of transaction involving an address, information indicative of a staking process or similar consensus functionality, and/or other information. By way of non-limiting illustration, stake class addresses may be associated with relatively less frequent transactions, but may be associated with relatively more transaction of the transaction stake class.

In some implementations, transaction information indicative of the bridge class one or more of interoperability functions (e.g., locking/unlocking value, minting/burning value, relaying information, and/or other functions), transaction frequency, and/or other information. By way of non-limiting illustration, bridge class addresses may be involved in transactions typically related to a bridging process. For example, transactions typically related to a bridging process may show frequent interactions involving value transfers between networks and/or transaction logs. In some implementations, bridge class addresses may be publicly known through some official documentation and/or other resource.

In some implementations, transaction information indicative of the exchange class may include one or more of transaction volume, amount of involved addresses, frequency of transactions, and/or other information. By way of non-limiting illustration, exchange class addresses may handle large volumes of transactions and/or may process numerous transactions in a short time. Exchange class addresses may use multiple addresses and/or may have addresses that interact with each other frequently. Exchange class addresses may have predictable patterns of high activity and/or regular transactions involving many different addresses.

By way of non-limiting illustration, classification component 109 may be configured to identify, from information recorded on the transaction log 150 and/or other information (e.g., transaction information), sets of transaction information indicative of one or more address classes. The classification component 109 may be configured to determine, from the sets of the transaction information, the address classes of the transactions.

By way of non-limiting illustration, the classification component 109 may be configured to determine the first address class for the first address based on a second set of the transaction information and/or other information being indicative of the first address class. In some implementations, the second set of the transaction information may include the first transaction information characterizing the first transaction and/or other transaction information characterizing one or more other transactions involving the first address. The second set of the transaction information may convey a behavior of the first address.

By way of non-limiting illustration, the classification component 109 may be configured to determine the second address class for the second address based on a third set of the transaction information being indicative of the second address class. In some implementations, the third set of the transaction information may include the first transaction information characterizing the first transaction and/or other transaction information characterizing one or more other transactions involving the second address. The third set of the transaction information may convey a behavior of the second address.

In some implementations, the user interface component 110 may be configured to assign individual visual characteristic to individual addresses and/or individual transaction. In some implementations, the user interface component 110 may be configured to obtain individual visual characteristic assignments previously assigned to individual addresses and/or individual transaction. In some implementations, assignment of an individual visual characteristic may generate an association with the individual visual characteristic so that presentation of a graph node representing an address and/or graph edge representing a transaction flow, as the case may be, may lead to presentation of the graph node and/or graph edge with an associated individual visual characteristic.

Visual characteristics may include one or more of shape, size, color, and/or other visual characteristics. By way of non-limiting illustration, shapes may include one or more of circle, square, diamond, triangle, octagon, line, arrowhead, and/or other shapes. In some implementations, size may be a relative characteristic. By way of non-limiting illustration, a graph node may comprise a circle shape having a diameter of one unit of measurement, while another graph node may comprise a circle shape having a diameter of two units of measurement. By way of non-limiting illustration, a visual characteristic of a graph edge may include a line shape having an arrow pointing in a direction of a transaction flow (e.g., from sender graph node and to recipient graph node). The user interface component 110 may be configured to cause the graph nodes to be displayed with visual characteristics assigned to addresses, and the graph edges to be displayed with visual characteristics assigned to transactions.

In some implementations, lines may be visually distinguished by line types. An individual line type may have a unique and distinguishable visualization. By way of non-limiting illustration, line types may include one or more of a thin line, a thick line, a double line, a dotted line, a triple line, a jagged line, and/or other line types.

The user interface component 110 may be configured to assign one or more visual characteristics to individual addresses based on the individual address classes and/or other information. In some implementations, addresses of the same address class may be assigned the same one or more visual characteristics. The same visual characteristic(s) assigned to addresses of the same class may be shape, color, and/or other visual characteristics. Accordingly, one or more visual characteristics may provide an immediate visual differentiation between addresses of different address classes and/or transactions of different transaction classes.

By way of non-limiting illustration, wallet class may be associated with a first shape and/or other visual characteristic, contract class may be associated with a second shape and/or other visual characteristic, validator class may be associated with a third shape and/or other visual characteristic, stake class may be associated with a fourth shape and/or other visual characteristic, bridge class may be associated with a fifth shape and/or other visual characteristic, an exchange class may be associated with a sixth shape and/or other visual characteristic, and/or other address classes may be associated with other shapes.

By way of non-limiting illustration, wallet class may be associated with a first color and/or other visual characteristic, contract class may be associated with a second color and/or other visual characteristic, validator class may be associated with a third color and/or other visual characteristic, stake class may be associated with a fourth color and/or other visual characteristic, bridge class may be associated with a fifth color and/or other visual characteristic, an exchange class may be associated with a sixth color and/or other visual characteristic, and/or other address classes may be associated with other visual characteristics.

The user interface component 110 may be configured to assign one or more visual characteristics to individual transactions based on the individual transaction classes and/or other information. In some implementations, transactions of the same transaction class may be assigned the same one or more visual characteristics. The same visual characteristic(s) assigned to transactions of the same class may be line type, color, and/or other visual characteristics.

By way of non-limiting illustration, transfer class may be associated with a first line type and/or other visual characteristic, swap class may be associated with a second line type and/or other visual characteristic, stake class may be associated with a third line type and/or other visual characteristic, fee class may be associated with a fourth line type and/or other visual characteristic, creation class may be associated with a fifth line type and/or other visual characteristic, an contract class may be associated with a sixth line type and/or other visual characteristic, and/or other transaction classes may be associated with other visual characteristics.

By way of non-limiting illustration, transfer class may be associated with a first color and/or other visual characteristic, swap class may be associated with a second color and/or other visual characteristic, stake class may be associated with a third color and/or other visual characteristic, fee class may be associated with a fourth color and/or other visual characteristic, creation class may be associated with a fifth color and/or other visual characteristic, an contract class may be associated with a sixth color and/or other visual characteristic, and/or other transaction classes may be associated with other visual characteristics.

By way of non-limiting illustration, the first address may be assigned a first visual characteristic based on classification in the first address class. The second address may be assigned a second visual characteristic based on classification in the second address class. The first transaction may be assigned a third visual characteristic based on classification in the first transaction class. The first visual characteristic may be a first shape. The second visual characteristic may be a second shape. The third visual characteristic may be a first line type.

In some implementations, one or more visual characteristics may be based on progress characteristics associated with addresses and/or transactions. Progress characteristics may refer to one or more of a passage of time, a completion of steps in a series of steps, and/or other measure of progress that may be a characteristic of an address and/or transaction. By way of non-limiting illustration, a contract class of address may carry out terms of a smart contract through execution of a series of steps. By way of non-limiting illustration, a staking address may execute a staking process by holding value for an amount of holding time. One or more visual characteristics may be specifically configured to reflect a current state of progress. A current state of progress may include one or more of amount of time lapsed, amount of time remaining, amount of steps completed, amount of steps remaining, and/or other measure of state of progress.

In some implementations, a visual characteristic reflecting a current state of progress may include one or more of a progressive fill, a dynamic graphic, and/or other visuals.

Figure 6:
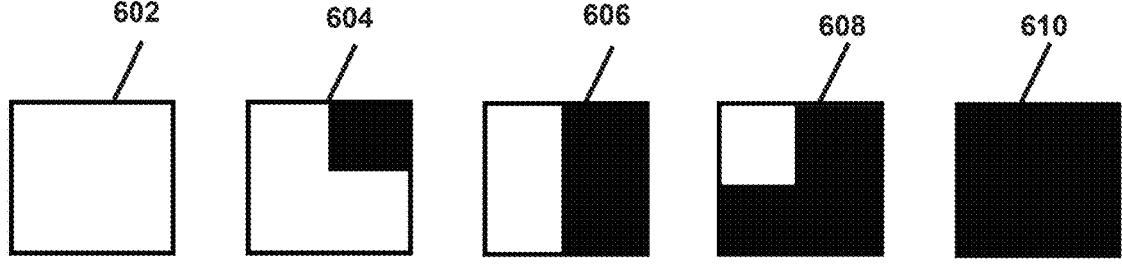
FIG. 6 illustrates a series of graph nodes representing visual changes to the graph nodes to reflect progress of a state of completion of a transaction, in accordance with one or more implementations.

A progressive fill may include a visual mechanism in which an area encompassed by a shape of a graph node is progressively filled-in with one or more of a color, a contrast, a shading, other shapes, and/or other visual elements to reflect the current state of progress (see, e.g., FIG. 6). By way of non-limiting illustration, a shape may be divided into set of segments (e.g., half's, thirds, fourths, fifths, sixths, etc.), where an individual segment is filled in to reflect progress. By way of non-limiting illustration, a contract address may be represented by a diamond, the diamond may be divided into segments (e.g., quarter segments reflecting, for example, a series of four steps that are to be completed in accordance with a smart contract), and individual segments are filled in with a color to reflect completion of individual steps. Accordingly, as the segments of the diamond are filled in, a user is provided a convenient visual indicator of the progress toward completion of a smart contract. By way of non-limiting illustration, a stake address may be represented by a square, the square may be divided into segments, and individual segments are filled in with a color to reflect passage of time. For example, if a stake process includes a 60-day hold period, the square may be divided into four segments, with an individual segment representing the passage of 15 days of the hold period. Accordingly, as the segments of the square are filled in, a user is provided a convenient visual indicator of the progress toward completion of the staking process.

A dynamic graphic may include a graphic (e.g., image, drawing, shape, icon, picture, logo, etc.) displayed along with a shape of a graph node (e.g., positioned within a shape) which dynamically changes to reflect a current state of progress. By way of non-limiting illustration, dynamic graphics may include one or more of a clock graphic, a stopwatch graphic, a countdown graphic, a calendar graphic, and/or other graphics. By way of non-limiting illustration, a stake address may be represented by a square, and may have a stopwatch graphic displayed in the square (e.g., graphic of a stopwatch face including a hand). The hand on the stopwatch face may dynamically change (e.g., rotate around a center point) to reflect a passage of time. Accordingly, as hand rotates, a user is provided a convenient visual indicator of the progress toward completion of the staking process.

Referring to the instances of a graphical user interface through which the transactions are represented as a graph, in some implementations, the graphical user interface may include one or more of a graph display portion that displays a graph and/or individual graph portions of the graph, an on-demand display portion that displays the address-specific information and/or transaction flow-specific information, a table display portion that displays text representations of a transaction, and/or other portions.

In some implementations, a display of a graph and/or graph portion may be characterized by one or more of an address-centric display, a transaction-centric display, a cross-network display, and/or other characteristics. An address-centric display may include a display which emphasizes and/or otherwise makes prominent one or more addresses. Emphasizing and/or making prominent may include, for example, positioning a graph node in a centered position (or substantially centered position) within the user interface so as to draw a user's attention to the graph node as a principal reason for the display. A transaction-centric display may include a display which emphasizes and/or otherwise makes prominent a transaction (and/or transaction flow). Emphasizing and/or making prominent may include, for example, positioning a graph edge in a centered position (or substantially centered position) within the user interface so as to draw a user's attention to the graph edge as a principal reason for the display.

An on-demand display portion may be configured to display one or more of address-specific information, transaction flow-specific information, and/or other information. The on-demand display portion may present information in response to user input requesting display within that portion. By way of non-limiting illustration, individual graph nodes and/or individual graph edges may comprise selectable user interface elements. Selection of an individual graph node (representing an individual address) and/or an individual graph edge (representing an individual transaction flow) may cause corresponding address-specific information (specific to the individual address) and/or transaction-flow specific information (specific to the individual transaction flow) to be presented within on-demand display portion.

The address-specific information, transaction flow-specific information, and/or other information presented within on-demand display portion may include information from transaction information obtained by transaction component 108, and/or information obtained from one or more other information sources. By way of non-limiting illustration, address-specific information associated with an individual address may include one or more of an amount of value associated with the individual address (e.g., the individual address's balance), a date when the individual address was created, identification of one or more other addresses associated with the individual address, an address class of the individual address, and/or other information. By way of non-limiting illustration, transaction flow-specific information associated with an individual transaction flow of an individual transaction may include one or more of identification of addresses associated with the individual transaction, indication of individual addresses as sender and/or recipient, a characterization of value transferred in the individual transaction, a fee associated with the individual transaction, timestamp for when the individual transaction was requested and/or executed, a transaction class of the individual transaction, and/or other information. In some implementations, value transferred in the individual transaction may be characterized by one or more of value type, amount, and/or other characterizations.

By way of non-limiting illustration, the user interface information may define a first instance of the graphical user interface through which the first transaction is represented in a first graph portion of the graph. The first instance of the graphical user interface may display one or more of a first graph node representing the first address, a second graph node representing the second address, a first graph edge representing a first transaction flow between the first address and the second address, and/or other content. The first graph node may be presented with the first visual characteristic based on the first visual characteristics being assigned to the first address. The second graph node may be presented with the second visual characteristic based on the second visual characteristics being assigned to the second address. The first graph edge may be presented with the third visual characteristic based on the third visual characteristic being assigned to the first transaction.

In some implementations, a cross-network display may correspond to a configuration of a graph display portion of a user interface that is specific to presenting transaction(s) involving more than one network (and/or more than one transaction log). Such transactions may include one or more of swap transactions, smart contract transactions, transactions involving bridge class address(es), and/or other transactions. A cross-network display may include one or more visual characteristics to visually differentiate between different networks involved in a transfer of value (e.g., movement of value from one transaction log to another). In some implementations, visual characteristic(s) that visually differentiate between different networks may include one or more of a demarcation line, color contrast, and/or other visual characteristics.

By way of non-limiting illustration, a demarcation line may be provided in a graph display portion to differentiate between addresses that are part of different networks. A demarcation line may be centered within the graph display portion and/or positioned in other ways. A graph node representing an address of one network may be positioned on one side of a demarcation line, and a graph node representing an address of another network may be positioned on another side of the demarcation line. In some implementations, a graph edge presenting a transaction flow may cross a demarcation line, indicating a transfer between networks. For bridge class address(es), a graph node representing a bridge class address may be positioned on the demarcation line (e.g., straddling the line). In some implementations, multiple demarcation lines may be provided to differentiate between additional networks. By way of non-limiting illustration, a graph display portion may be divided into two or more sections using one or more demarcation lines.

By way of non-limiting illustration, color contrast may be provided in a graph display portion to differentiate between addresses that are part of different networks. The graph display portion may be divided into two or more sections, with individual sections having an individual color, and with different colors representing different networks. A graph node representing an address of one network may be positioned in a section of a given color, another graph node representing another address of another network may be positioned in a section of another given color, etc. In some implementations, a graph edge presenting a transaction flow may extend between an intersection of colors, indicating a transfer between networks. A graph node representing a bridge class address may be positioned at an intersection of two or more colors (e.g., straddling the intersection).

The user interface component 110 may be configured to effectuate communication of the user interface information to client computing platform(s) 104 associated with the user(s) to cause client computing platform(s) 104 to present instance(s) of the graphical user interface.

By way of non-limiting illustration, the user interface information defining the first instance of the graphical user interface may be communicated to a first remotely located client computing platform over a first network connection. Receipt of the user interface information at the first remotely located client computing platform may cause the first remotely located client computing platform to display the first graph portion including one or more of the first graph node, the second graph node, the first graph edge connecting between the first graph node and the second graph node, and/or other content. The first graph node may be presented with the first visual characteristic. The second graph node may be presented with the second visual characteristic. The first graph edge may be presented with the third visual characteristic.

Based on the features and/or functions herein, an improved user interface is provided which makes information underlying a transaction log more understandable through particularized visualization, eliminating the need to decipher complex strings of characters to gain insights. Different classes of transactions may be represented differently so as to visually distinguish between the different classes of transactions. Different classes of addresses may be represented differently so as to visually distinguish between the different classes of addresses. Addresses and/or transactions may be presented predominately within a display to draw focus to a user's search and the insights they wish to gain. Other features and/or functions described herein may also contribute to improvements intended by the inventor(s) and/or improvements that may become apparent to a person having ordinary skill in the art.

In some implementations, instances of the user interface may be configured to receive user input into the instances of the user interface at the client computing platform(s) 104. The user input may include one or more of selection of individual user interface elements, text entry, and/or other input. By way of non-limiting illustration, individual graph nodes, individual graph edges, and/or other content of user interface may be selectable to effectuate one or more actions.

The user interface component 110 may be configured to obtain and/or generate user input information conveying user input within the instances of the user interface at the client computing platform(s) 104. By way of non-limiting illustration, the user input information may convey user input including selection of individual graph nodes, selection of the individual graph edges, selection from drop down menus, selection of virtual buttons or icons, and/or other selection of other user-selectable content displayed in the instances of the graphical user interface.

In some implementations, the user input information may be stored in non-transitory electronic storage 128 and/or other storage locations. In some implementations, interactions at the client computing platform(s) 104 comprising user input may be communicated to user interface component 110 such that user interface component 110 may generate the user input information. In some implementations, individual client computing platforms may generate the user input information based on the user entry and/or selection at the client computing platform(s) 104 and communicate the user input information to the user interface component 110.

By way of non-limiting illustration, user interface component 110 may be configured to obtain first user input information conveying first user input into the first instance of the graphical user interface.

The user interface component 110 may be configured to, responsive to obtaining user input information, cause the instances of the graphical user interface to display one or more of address-specific information, transaction flow-specific information, and/or other information. The user interface component 110 may be configured to, responsive to obtaining user input information, perform one or more other actions. The one or more other actions may include, for example, one or more of displaying a pop-up window, displaying a drop down menu, navigating to another view, and/or other actions.

By way of non-limiting illustration, user interface component 110 may be configured to obtain first user input information conveying first user input into the first instance of the graphical user interface. In response to the first user input including selection of the first graph node, user interface component 110 may be configured to cause the first instance of the graphical user interface to display first information specific to the first address. In response to the first user input including selection of the second graph node, user interface component 110 may be configured to cause the first instance of the graphical user interface to display second information specific to the second address. In response to the first user input including selection of the first graph edge, user interface component 110 may be configured to cause the first instance of the graphical user interface to display third information specific to the first transaction flow.

In some implementations, a user interface may include one or more user interface elements through which users submit search terms and/or queries. Submission may be accomplished through one or more of text input, selection of a check box, and/or other interactions. By way of non-limiting illustration, the user interface may include a user interface element comprising a text input box through which users submit search terms and/or queries.

In some implementations, a search term and/or query may include one or more of a part or a whole of an address's identification (e.g., a unique identifier such as a string of alphanumeric character), a part or a whole of a transaction's identification (e.g., a unique identifier such as a string of alphanumeric character), and/or other information.

The query component 112 may be configured to obtain user-submitted search terms and/or queries input through instances of the user interface. The query component 112 may be configured to access the transaction log 150 and/or other storage location (e.g., other transaction logs). The query component 112 may be configured to access the transaction log 150 through one or more of an Application Programming Interface (API) providing direct access to the transaction log 150 through one or more nodes, SQL database, and/or by other mechanisms. The query component 112 may be configured to indirectly access the transaction log 150 by accessing a web service that has access to the transaction log 150. By way of non-limiting illustration, a web service may compile and/or format information recorded on transaction log 150 into a searchable format.

The query component 112 may be configured to search the transaction log 150 (directly and/or indirectly) based on the user-submitted search terms and/or queries. The query component 112 may be configured to identify transaction(s) recorded on the transaction log 150 that match and/or are matched with the user-submitted search terms and/or queries. Responsive to query component 112 identifying transaction(s) recorded on the transaction log 150 that match and/or are matched with the user-submitted search terms and/or queries, transaction component 108 may be configured to obtain transaction information and/or other information.

Figure 3:
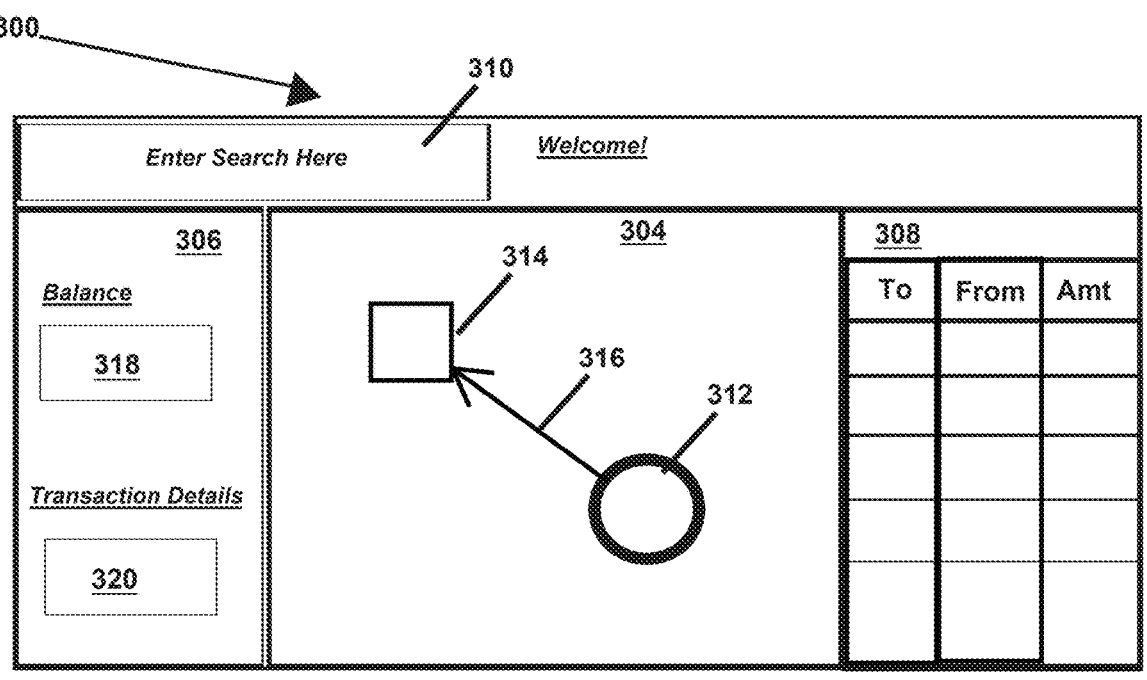
FIG. 3 illustrates a user interface, in accordance with one or more implementations.

FIG. 3 illustrates a user interface 300, in accordance with one or more implementations. The user interface 300 may display one or more of a graph display portion 304 that displays the at least a graph portion of a graph, an on-demand display portion 306 that displays text such as address-specific information and/or transaction flow-specific information, a table display portion 308 that displays text representations of a transaction, and/or other content.

Users may initiate presentations within user interface 300 by submitting queries. Submission may be accomplished, for example, by providing input into a search field 310. The search field 310 may comprise, for example, a text input box.

As used herein, the graph display portion 304 may display one or more of graph nodes representing addresses, graph edges between the graph nodes representing transaction flow between the addresses, and/or other content. By way of non-limiting illustration, in response to a search query and identification of a first transaction, transaction information for the first transaction may be obtained, and may provide a basis from which visualizations within graph display portion 304 are generated. By way of non-limiting illustration, graph display portion 304 may display one or more of a first graph node 312 representing a first address, a second graph node 314 representing a second address, and a first graph edge 316 representing a first transaction flow between the first address and the second address in accordance with the first transaction. The first graph node 312 and/or second graph node 314 may have one or more visual characteristics. By way of non-limiting illustration, first graph node 312 may have a respective graph node shape, such as a circle, which is representative of an address class of the first address. By way of non-limiting illustration, second graph node 314 may have a respective graph node shape, such as a square, which is representative of an address class of the second address. In some implementations, first graph node 312 and/or second graph node 314 may have individual graph node sizes. The relevant sizes may represent differences in total value associated with individual ones of the addresses (e.g., wallet "balance"), such that a larger shape may represent a larger total value. The first graph edge 316 may have one or more visual characteristics. By way of non-limiting illustration, first graph edge 316 may have an arrowhead pointing in the direction of the transaction flow (e.g., from the first graph node 312 to the second graph node 314). The first graph edge 316 may have a visual characteristic based on a transaction class of the first transaction. By way of non-limiting illustration, first graph edge 316 may have a single line type line visual characteristics which may be representative of the transaction class of the first transaction.

In a scenario where the search query returns an identification of the first transaction, the user interface 300 may display the graph portion within the graph display portion 304 as a transaction-centric display. By way of non-limiting illustration, the first graph edge 316 may be displayed relatively centered within graph display portion 304 and/or presented in other ways that makes the first graph edge 316 more prominent that other elements in graph display portion 304.

In some implementations, in response to user input including selection of the first graph node 312, the user interface 300 may display first information specific to the first address within on-demand display portion 306 (e.g., within sub-portion 318). The first information may include one or more of an amount of value associated with the first address, an address class of the first address, and/or other information. In some implementations, in response to input including selection of the second graph node 314, the user interface 300 may display second information specific to the second address within on-demand display portion 306 (e.g., within sub-portion 318). The second information may include one or more of an amount of value associated with the second address, an address class of the second address, and/or other information. In some implementations, in response to user input including selection of the first graph edge 316, the user interface 300 may display third information specific to the first transaction flow within on-demand display portion 306 (e.g., within sub-portion 320). The third information may include one or more of an indication of the first address as a sender, an indication of the second address as a recipient, a characterization of value transferred in the first transaction, a fee associated with the first transaction, a timestamp for when the first transaction was executed, a transaction class of the first transaction, and/or other information.

The table display portion 308 may display text representations of transactions. Such display may represent a typical form of presentation of information characterizing transactions recorded on a transaction log. By way of non-limiting illustration, the table display portion 308 may include a grid of cells arranged in attribute-name columns and rows of cells including text corresponding attributes names in the attribute-named columns. The attributes may include one or more of a timestamp, a sender, a recipient, an amount of value transferred, and/or other attributes.

Figure 4:
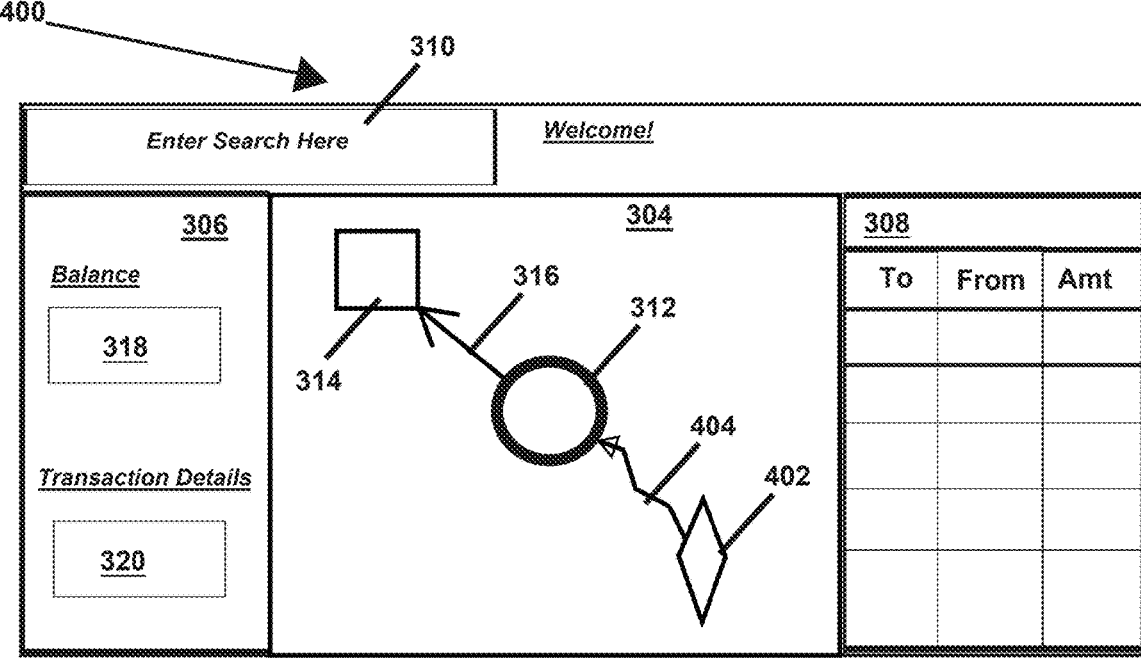
FIG. 4 illustrates a user interface, in accordance with one or more implementations.

FIG. 4 illustrates a user interface 400, in accordance with one or more implementations. The user interface 400 may include similar elements as user interface 300 of FIG. 3, with like reference numerals referring to like elements.

In some implementations, user interface 400 may be presented as a result of a search query that identifies the first address (as opposed to the first transaction in FIG. 3). In some implementations, user interface 400 may be presented as a result of further user input into FIG. 3. By way of non-limiting illustration, a user may provide further input with respect to the first graph node 312. Such further input may include, for example, selecting the first graph node 312 to cause a dropdown menu to be displayed, and selecting an option to view a graph portion of the graph with the first address being prominent. This may return a presentation that graphically represents one or more transactions involving the first address.

By way of non-limiting illustration, in response to identification of a first address, graph display portion 304 may display one or more of the first graph node 312 representing the first address, the second graph node 314 representing the second address, the first graph edge 316 representing a first transaction flow between the first address and the second address in accordance with the first transaction, a third graph node 402 representing a third address, and a second graph edge 404 representing a second transaction flow between the first address and the third address in accordance with the second transaction.

In some implementations, third graph node 402 may have a respective graph node shape, such as a diamond, which is representative of an address class of the third address. The second graph edge 404 may have one or more visual characteristics. By way of non-limiting illustration, second graph edge 404 may have an arrowhead pointing in the direction of a transaction flow (e.g., from the third graph node 402 to the first graph node 312). The second graph edge 404 may have a visual characteristic based on a transaction class of the second transaction. By way of non-limiting illustration, second graph edge 404 may have a jagged line type line visual characteristic which may be representative of a transaction class of the second transaction.

In a scenario where the search query returns an identification of the first address (e.g., based on a result of the search query and/or further user input into FIG. 3), the user interface 300 may display the graph portion within the graph display portion 304 as an address-centric display. By way of non-limiting illustration, the first graph node 312 may be displayed relatively centered within graph display portion 304 and/or presented in other ways that makes the first graph node 312 more prominent that other elements in graph display portion 304.

In some implementations, in response to user input including selection of the third graph node 402, the user interface 300 may display fourth information specific to the third address within on-demand display portion 306 (e.g., within sub-portion 318). The fourth information may include an amount of value associated with the third address and/or other information. In some implementations, in response to user input including selection of the second graph edge 404, the user interface 300 may display fifth information specific to the second transaction flow within on-demand display portion 306 (e.g., within sub-portion 320). The fifth information may include one or more of an indication of the third address as a sender, an indication of the first address as a recipient, a characterization of value transferred in the second transaction, a fee associated with the second transaction, a timestamp for when the second transaction was executed, and/or other information.

Figure 5:
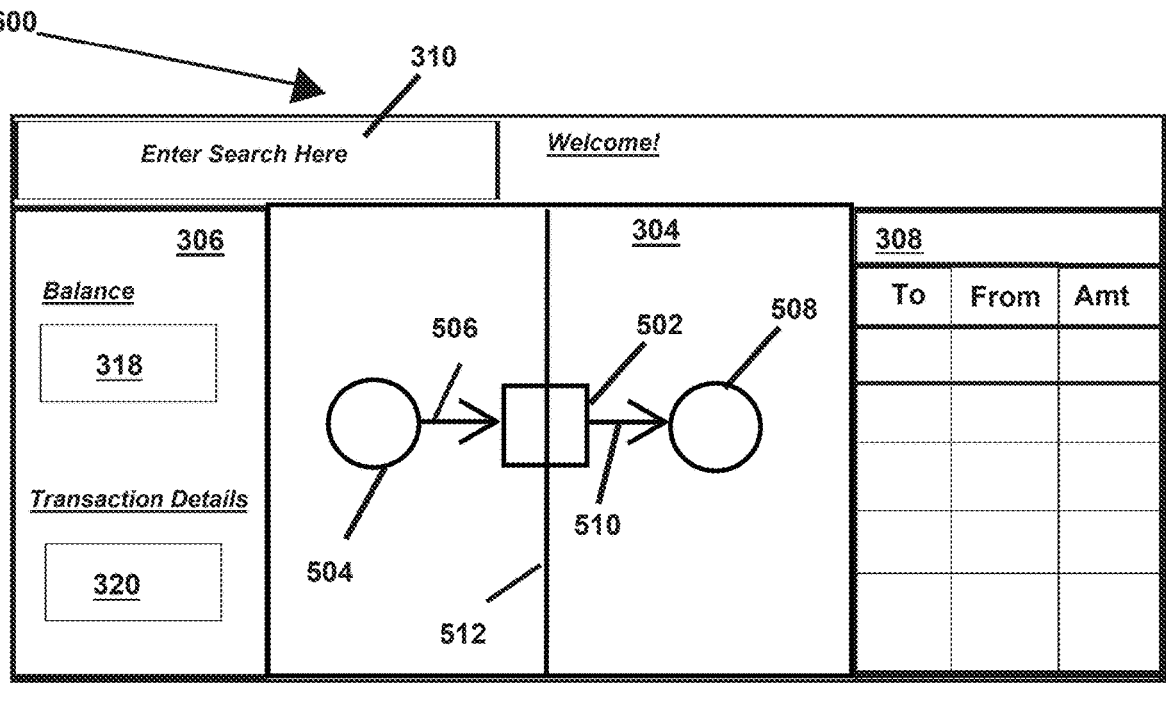
FIG. 5 illustrates a user interface, in accordance with one or more implementations.

FIG. 5 illustrates a user interface 500, in accordance with one or more implementations. The user interface 500 may include similar elements as user interface 300 of FIG. 3 and/or user interface 400 FIG. 4, with like reference numerals referring to like elements.

In some implementations, user interface 500 may be presented as a result of an identification of a transaction involving more than one network, such as a transaction involving an address of the bridge class. By way of non-limiting illustration, graph display portion 304 may display one or more of a first graph node 502 representing a bridge class address, a second graph node 504 representing a source address (e.g., a wallet class address), a first graph edge 506 representing a transaction flow between the bridge class address and the source address in accordance with a first transaction, a third graph node 508 representing a destination address (e.g., another wallet class address), a second graph edge 510 representing a transaction flow between the bridge class address and the destination address in accordance with a second transaction.

The first graph node 502 may have a graph node shape, such as a square, which may be representative of the bridge class. The second graph node 504 and the third graph node 508 may have graph node shapes, such as a circle, which may be representative of a common address class (e.g., wallet class). The first graph edge 506 may have an arrowhead pointing in the direction of the transaction flow of the first transaction (e.g., from the second graph node 504 to the first graph node 502); and the second graph edge 510 may have an arrowhead pointing in the direction of the transaction flow of the second transaction (e.g., from the first graph node 502 to the third graph node 508).

In some implementations, in accordance with transfer(s) involving more than one network, value may be transferred from one network to another. The graph display portion 304 may include a demarcation line 512 and/or other visual characteristics to differentiate between addresses that are part of different networks. The demarcation line 512 may be centered within the graph display portion 304 and/or positioned in other ways. The second graph node 504 representing the source address may be positioned on one side of the demarcation line 512 (e.g., left side in the view of FIG. 5) to illustrate that the source address is part of a given network, and the third graph node 508 representing the destination address may be positioned on another side of the demarcation line 512 (e.g., right side in the view of FIG. 5) to illustrate that the receiving address is part of another given network. In some implementations, the first graph node 502 representing the bridge class address may be positioned on the demarcation line 512 (e.g., straddling the line).

FIG. 6 illustrates a series of graph nodes representing visual changes to a graph node to reflect progress of a state of completion of a transaction, in accordance with one or more implementations. By way of non-limiting illustration, a stake address may be represented by a square, the square may be divided into segments, and individual segments may be filled in with a color to reflect passage of time. For example, if a stake process includes a 60-day hold period, the square may be divided into four segments, with an individual segment representing the passage of 15 days of the hold period. In FIG. 6, graph node 602 may include an un-filled square, representing a start of a staking process; graph node 604 may include a quarter-filled square, representing a passage of a quarter of a hold period (e.g., 15 days); graph node 606 may include a half-filled square, representing a passage of half of a hold period (e.g., 30 days); graph node 608 may include a three quarter-filled square, representing a passage of three quarters of a hold period (e.g., 45 days); and graph node 610 may include a filled square, representing a passage of the entire hold period (e.g., 60 days). Accordingly, as the segments of the square are filled in, a user is provided a convenient visual indicator of the progress toward completion of the staking process.

It is to be appreciated that the depictions and corresponding descriptions for FIGS. 3-6 are for illustrative purposes only and are not to be considered limiting. Instead, they are illustrative of different ways transactions recorded on immutable distributed electronic storage media may be graphically represented in accordance with this disclosure.

Referring back to FIG. 1, in some implementations, server(s) 102, client computing platform(s) 104, electronic storage media 140, and/or external resources 126 may be operatively linked via one or more electronic communication links. For example, such electronic communication links may be established, at least in part, via network(s) 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, a given client computing platform may include one or more of a desktop computer, a laptop computer, a handheld computer, a tablet computing platform, a NetBook, a Smartphone, a gaming console, and/or other computing platforms.

Server(s) 102 may include electronic storage 128, one or more processors 130, and/or other components. Server(s) 102 may include communication lines, or ports to enable the exchange of information with network(s) 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s)

102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 109, 110, 112, and/or other components. Processor(s) 130 may be configured to execute components 108, 109, 110, 112, and/or other components by software; hardware; firmware; some combination of software, hardware, and/or firmware; and/or other mechanisms for configuring processing capabilities on processor(s) 130. As used herein, the term "component" may refer to a component or set of components that perform the functionality attributed to the component. This may include one or more physical processors during execution of processor readable instructions, the processor readable instructions, circuitry, hardware, storage media, or any other components.

It should be appreciated that although components 108, 109, 110, and/or 112 are illustrated in FIG. 1 as being implemented within a single processing unit, in implementations in which processor(s) 130 include multiple processing units, one or more of components 108, 109, 110, and/or 112 may be implemented remotely from the other components. The description of the functionality provided by the different components 108, 109, 110, and/or 112 described below is for illustrative purposes, and is not intended to be limiting, as any of components 108, 109, 110, and/or 112 may provide more or less functionality than is described. For example, one or more of components 108, 109, 110, and/or 112 may be eliminated, and some or all of its functionality may be provided by other ones of components 108, 109, 110, and/or 112. As another example, processor(s) 130 may be configured to execute one or more additional components that may perform some or all of the functionality attributed below to one of components 108, 109, 110, and/or 112.

Figure 2:
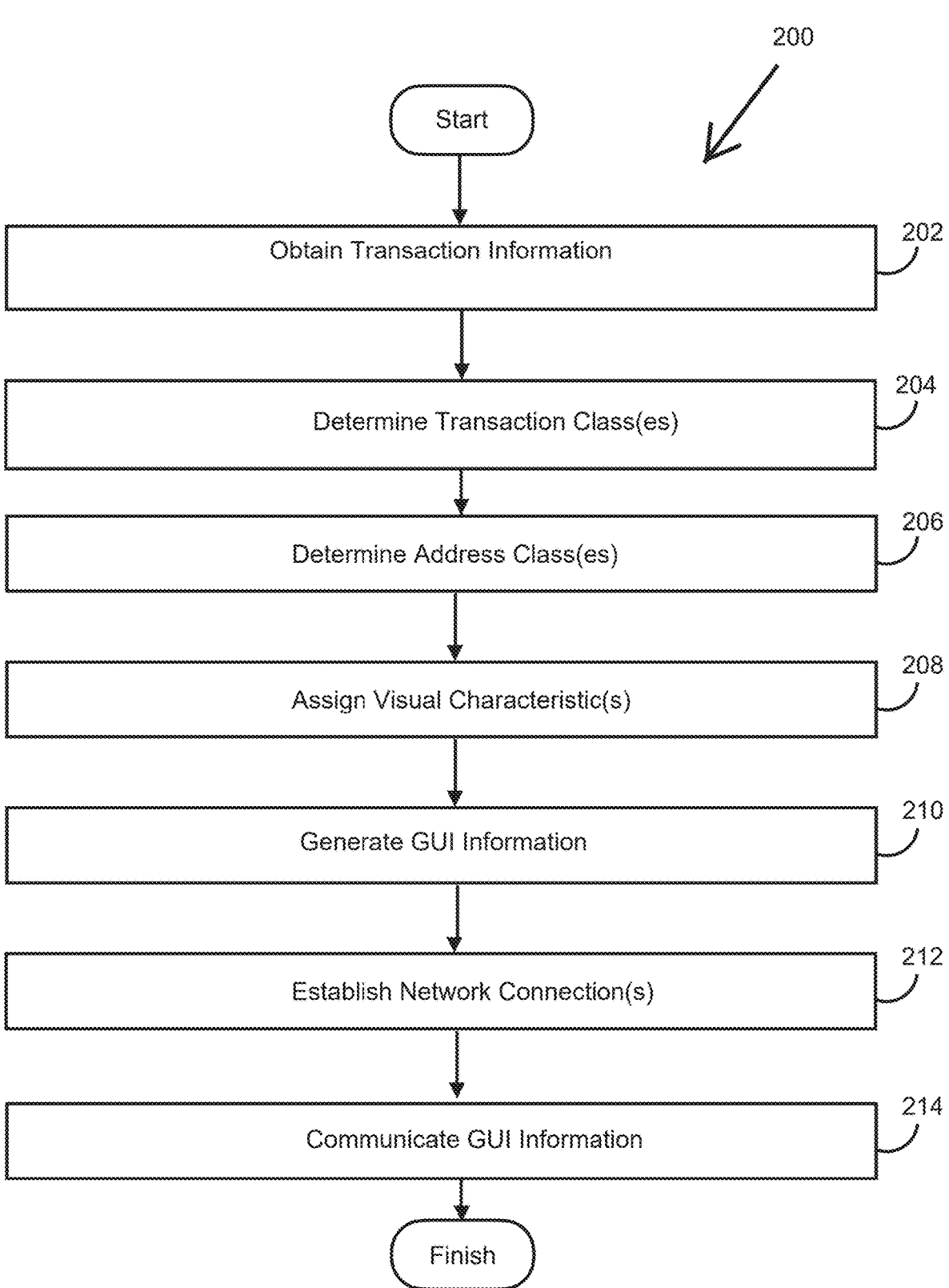
FIG. 2 illustrates a method to classify transactions recorded on immutable distributed electronic storage media to generate graphical representations of the transactions, in accordance with one or more implementations.

FIG. 2 illustrates method 200 to classify transactions recorded on immutable distributed electronic storage media to generate graphical representations of the transactions, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may obtain transaction information and/or other information. The transaction information may characterize transactions recorded on a transaction log stored on immutable distributed electronic storage media and/or other storage media. The transaction information may include identification of one or more addresses associated with the transactions, and/or other information. By way of non-limiting illustration, first transaction information may characterize a first transaction and/or other transactions. The first transaction may be characterized by one or more of a first address, a second address, a first transaction flow, and/or other information. Operation 202 may be performed by one or more hardware processors configured by machine-readable instructions including a component that is the same as or similar to transaction component 108 (shown in FIG. 1 and described herein), in accordance with one or more implementations.

An operation 204 may determine transaction classifications of transactions. Individual transactions may be classified in individual transaction classes. By way of non-limiting illustration, the first transaction may be classified in a first transaction class. Operation 204 may be performed by one or more hardware processors configured by machine-readable instructions including a component that is the same as or similar to classification component 109 (shown in FIG. 1 and described herein), in accordance with one or more implementations.

An operation 206 may determine address classifications of address. Individual address may be classified in individual address classes. By way of non-limiting illustration, the first address may be classified in a first address class. By way of non-limiting illustration, the second address may be classified in a second address class. Operation 206 may be performed by one or more hardware processors configured by machine-readable instructions including a component that is the same as or similar to classification component 109 (shown in FIG. 1 and described herein), in accordance with one or more implementations.

An operation 208 may assign one or more visual characteristics to individual addresses based on individual address classes and/or other information, assign one or more visual characteristics to individual transactions based on individual transaction classes, and/or perform other operations. By way of non-limiting illustration, the first address may be assigned a first visual characteristic based on classification in the first address class. The second address may be assigned a second visual characteristic based on classification in the second address class. The first transaction may be assigned a third visual characteristic based on classification in the first transaction class. Operation 208 may be performed by one or more hardware processors configured by machine-readable instructions including a component that is the same as or similar to user interface component 110 (shown in FIG. 1 and described herein), in accordance with one or more implementations.

An operation 210 may generate user interface information defining instances of a graphical user interface through which the transactions are represented as a graph and/or in other ways. By way of non-limiting illustration, the graphical user interface may display, within a field of two or more dimensions, at least a graph portion of the graph. The graph may be comprised of one or more of graph nodes, graph edges between graph nodes, and/or other content. The graph nodes within the graph may represent the addresses. The graph edges between the graph nodes may represent transaction flow between the addresses. The graph nodes may be presented with the visual characteristics assigned to the addresses. The graph edges may be presented with the visual characteristics assigned to the transactions. By way of non-limiting illustration, the user interface information may define a first instance of the graphical user interface through which the first transaction is represented in a first graph portion of the graph. The first instance of the graphical user interface may display one or more of a first graph node representing the first address, a second graph node representing the second address, a first graph edge representing the first transaction flow between the first address and the second address, and/or other content. The first graph node may be presented with the first visual characteristic assigned to the first address. The second graph node may be presented with the second visual characteristic assigned to the second address. The first graph edge may be presented with the third visual characteristic assigned to the first transaction. Operation 210 may be performed by one or more hardware processors configured by machine-readable instructions including a component that is the same as or similar to user interface component 110 (shown in FIG. 1 and described herein), in accordance with one or more implementations.

An operation 212 may establish one or more network connections with remotely located client computing platforms associated with users. Operation 212 may be performed by one or more hardware processors configured by machine-readable instructions including a component that is the same as or similar to user interface component 110 (shown in FIG. 1 and described herein), in accordance with one or more implementations.

An operation 214 may effectuate communication of the user interface information to the remotely located client computing platforms associated with the users to cause the remotely located client computing platforms to present the instances of the graphical user interface. By way of non-limiting illustration, the user interface information defining the first instance of the graphical user interface may be communicated to a first remotely located client computing platform over a first network connection. Reception of the user interface information at the first remotely located client computing platform may cause the first remotely located client computing platform to display the first graph portion including one or more of the first graph node, the second graph node, the first graph edge connecting between the first graph node and the second graph node, and/or other content. The first graph node may be presented with the first visual characteristic. The second graph node may be presented with the second visual characteristic. The first graph edge may be presented with the third visual characteristic. Operation 214 may be performed by one or more hardware processors configured by machine-readable instructions including a component that is the same as or similar to user interface component 110 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to classify cryptocurrency transactions recorded on immutable distributed electronic storage media to generate graphical representations of the transactions, the system comprising:

one or more processors configured by machine-readable instructions to:

obtain transaction information characterizing cryptocurrency transactions recorded on a transaction log stored on immutable distributed electronic storage media, the transaction information identifying addresses associated with the cryptocurrency transactions, such that first transaction information characterizes a first cryptocurrency transaction and identifies a first address and a second address, the first cryptocurrency transaction involving a transfer of value between the first address and the second address;

determine transaction classifications of the cryptocurrency transactions, individual cryptocurrency transactions being classified in individual transaction classes, such that the first cryptocurrency transaction is classified in a first transaction class;

determine address classifications of the addresses, individual addresses being classified in individual address classes, such that the first address is classified in a first address class, and the second address is classified in a second address class;

assign one or more visual characteristics to the individual addresses and the individual cryptocurrency transactions based on the individual address classes and the individual transaction classes, respectively, such that the first address is assigned a first visual characteristic based on classification in the first address class, the second address is assigned a second visual characteristic based on classification in the second address class, and the first cryptocurrency transaction is assigned a third visual characteristic based on classification in the first transaction class;

generate user interface information defining instances of a graphical user interface through which the cryptocurrency transactions are represented as a graph, the graphical user interface displaying, within a field of two or more dimensions, at least a graph portion of the graph, wherein graph nodes within the graph represent the addresses and graph edges between the graph nodes represent transaction flow between the addresses, the graph nodes are presented with the visual characteristics assigned to the addresses, and the graph edges are presented with the visual characteristics assigned to the cryptocurrency transactions, such that the user interface information defines a first instance of the graphical user interface through which the first cryptocurrency transaction is represented in a first graph portion of the graph, the first instance of the graphical user interface displaying a first graph node representing the first address, a second graph node representing the second address, and a first graph edge representing a first transaction flow of the transfer of value between the first address and the second address;

establish one or more network connections with remotely located client computing platforms associated with users; and effectuate communication of the user interface information to the remotely located client computing platforms associated with the users to cause the remotely located client computing platforms to present the instances of the graphical user interface, such that the user interface information defining the first instance of the graphical user interface is communicated to a first remotely located client computing platform over a first network connection to cause the first remotely located client computing platform to display the first graph portion including the first graph node, the second graph node, and the first graph edge, wherein the first graph node is presented with the first visual characteristic, the second graph node is presented with the second visual characteristic, and the first graph edge is presented with the third visual characteristic, wherein the third visual characteristic is determined based on the classification of the first cryptocurrency transaction in the first transaction class.

2. The system of claim 1, wherein the first visual characteristic is a first shape, the second visual characteristic is a second shape, and the third visual characteristic is a first line type, wherein the first line type is selected from a set of available line types based on the classification of the first cryptocurrency transaction in the first transaction class, and wherein the set of available line types includes the first line type, a second line type, and a third line type.

3. The system of claim 1, wherein address classes include one or more of a wallet class, a contract class, a validator class, a stake class, a bridge class, or an exchange class.

4. The system of claim 1, wherein transaction classes include one or more of a transfer class, a swap class, a stake class, a fee class, a creation class, or a contract class.

5. The system of claim 1, wherein the one or more processors are further configured by the machine-readable instructions to:

determine, from sets of the transaction information, the transaction classes of the cryptocurrency transactions, such that the first transaction class is determined for the first cryptocurrency transaction based on a first set of the transaction information being indicative of the first transaction class.

6. The system of claim 1, wherein the one or more processors are further configured by the machine-readable instructions to:

determine, from sets of the transaction information, the address classes of the addresses, such that the first address class is determined for the first address based on a first set of the transaction information being indicative of the first address class.

7. The system of claim 6, wherein the first set of the transaction information includes the first transaction information and/or other transaction information characterizing one or more other transactions involving the first address.

8. The system of claim 7, wherein the first set of the transaction information conveys a behavior of the first address over the first cryptocurrency transaction and the one or more other transactions.

9. The system of claim 1, wherein the one or more processors are further configured by the machine-readable instructions to:

obtain user-submitted searches;

identify the cryptocurrency transactions recorded on the transaction log stored on the immutable distributed electronic storage media that match the user-submitted searches; and obtain the transaction information for the cryptocurrency transactions matched to the user-submitted searches.

10. The system of claim 1, wherein the first instance of the graphical user interface presents the first graph portion of the graph to visually indicate the first transaction represents a cross-network transaction between the transaction log and an other transaction log, such that the first graph node is visually indicated as being part of the transaction log managed by a first transaction network, and the second graph node is visually indicated as being part of the other transaction log managed by a second transaction network; and wherein the first transaction is visually indicated as the cross-network transaction based on color contrast or a demarcation line.

11. A method to classify cryptocurrency transactions recorded on immutable distributed electronic storage media to generate graphical representations of the cryptocurrency transactions, the method comprising:

obtaining transaction information characterizing cryptocurrency transactions recorded on a transaction log stored on immutable distributed electronic storage media, the transaction information identifying addresses associated with the cryptocurrency transactions, including obtaining first transaction information characterizing a first cryptocurrency transaction and identifying a first address and a second address;

determining transaction classifications of the cryptocurrency transactions, individual cryptocurrency transactions being classified in individual transaction classes, including determining the first cryptocurrency transaction is classified in a first transaction class;

determining address classifications of the addresses, individual addresses being classified in individual address classes, including determining the first address is classified in a first address class, and the second address is classified in a second address class;

assigning one or more visual characteristics to the individual addresses and the individual cryptocurrency transactions based on the individual address classes and the individual transaction classes, respectively, including assigning the first address to a first visual characteristic based on classification in the first address class, assigning the second address to a second visual characteristic based on classification in the second address class, and assigning the first cryptocurrency transaction to a third visual characteristic based on classification in the first transaction class;

generating user interface information defining instances of a graphical user interface through which the cryptocurrency transactions are represented as a graph, the graphical user interface displaying, within a field of two or more dimensions, at least a graph portion of the graph, wherein graph nodes within the graph represent the addresses and graph edges between the graph nodes represent transaction flow between the addresses, the graph nodes are presented with the visual characteristics assigned to the addresses, and the graph edges are presented with the visual characteristics assigned to the cryptocurrency transactions, wherein the user interface information defines a first instance of the graphical user interface through which the first cryptocurrency transaction is represented in a first graph portion of the graph, the first instance of the graphical user interface displaying a first graph node representing the first address, a second graph node representing the second address, and a first graph edge representing a first transaction flow of the transfer of value between the first address and the second address;

establishing one or more network connections with remotely located client computing platforms associated with users; and effectuating communication of the user interface information to the remotely located client computing platforms associated with the users to cause the remotely located client computing platforms to present the instances of the graphical user interface, including effectuating communication of the user interface information defining the first instance of the graphical user interface to a first remotely located client computing platform over a first network connection to cause the first remotely located client computing platform to display the first graph portion including the first graph node, the second graph node, and the first graph edge, wherein the first graph node is presented with the first visual characteristic, the second graph node is presented with the second visual characteristic, and the first graph edge is presented with the third visual characteristic, wherein the third visual characteristic is determined based on the classification of the first cryptocurrency transaction in the first transaction class.

12. The method of claim 11, wherein the first visual characteristic is a first shape, the second visual characteristic is a second shape, and the third visual characteristic is a first line type, wherein the first line type is selected from a set of available line types based on the classification of the first cryptocurrency transaction in the first transaction class, and wherein the set of available line types includes the first line type, a second line type, and a third line type.

13. The method of claim 11, wherein address classes include one or more of a wallet class, a contract class, a validator class, a stake class, a bridge class, or an exchange class.

14. The method of claim 11, wherein transaction classes include one or more of a transfer class, a swap class, a stake class, a fee class, a creation class, or a contract class.

15. The method of claim 11, further comprising:

determining, from sets of the transaction information, the transaction classes of the cryptocurrency transactions, including determining the first transaction class for the first cryptocurrency transaction based on a first set of the transaction information being indicative of the first transaction class.

16. The method of claim 11, further comprising:

determining, from sets of the transaction information, the address classes of the addresses, including determining the first address class for the first address based on a first set of the transaction information being indicative of the first address class.

17. The method of claim 16, wherein the first set of the transaction information includes the first transaction information and/or other transaction information characterizing one or more other transactions involving the first address.

18. The method of claim 17, wherein the first set of the transaction information conveys a behavior of the first address over the first cryptocurrency transaction and the one or more other transactions.

19. The method of claim 11, further comprising:

obtaining user-submitted searches;

identifying the cryptocurrency transactions recorded on the transaction log stored on the immutable distributed electronic storage media that match the user-submitted searches; and obtaining the transaction information for the cryptocurrency transactions matched to the user-submitted searches.

20. The method of claim 11, wherein the first instance of the graphical user interface presents the first graph portion of the graph to visually indicate the first transaction represents a cross-network transaction between the transaction log and an other transaction log, such that the first graph node is visually indicated as being part of the transaction log managed by a first transaction network, and the second graph node is visually indicated as being part of the other transaction log managed by a second transaction network; and wherein the first transaction is visually indicated as the cross-network transaction based on color contrast or a demarcation line.

* * * * *